Feb. 24, 1959 D. C. MUNRO 2,874,514
NOISE MAKING DEVICE FOR VELOCIPEDES OR THE LIKE
Filed Dec. 12, 1955
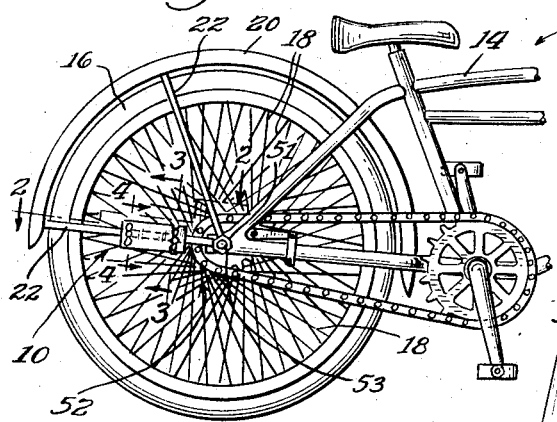
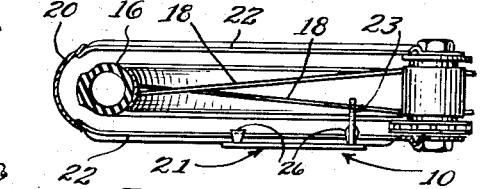
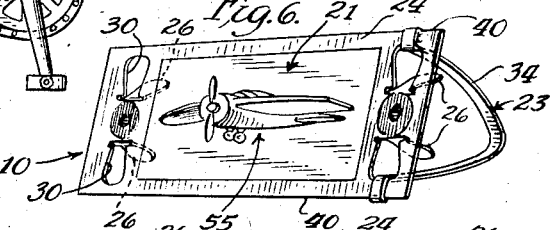
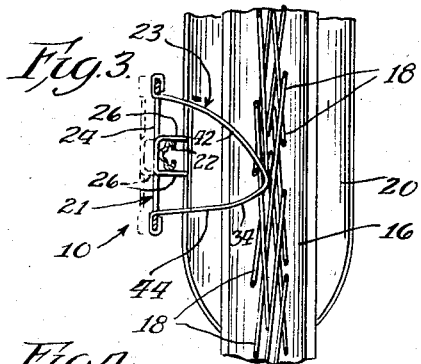
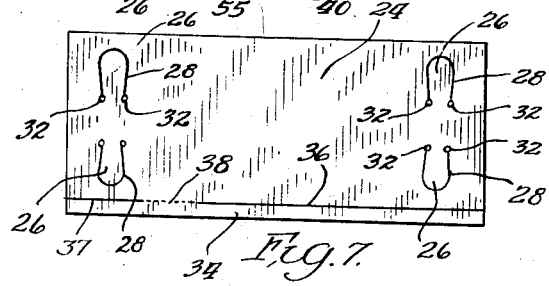
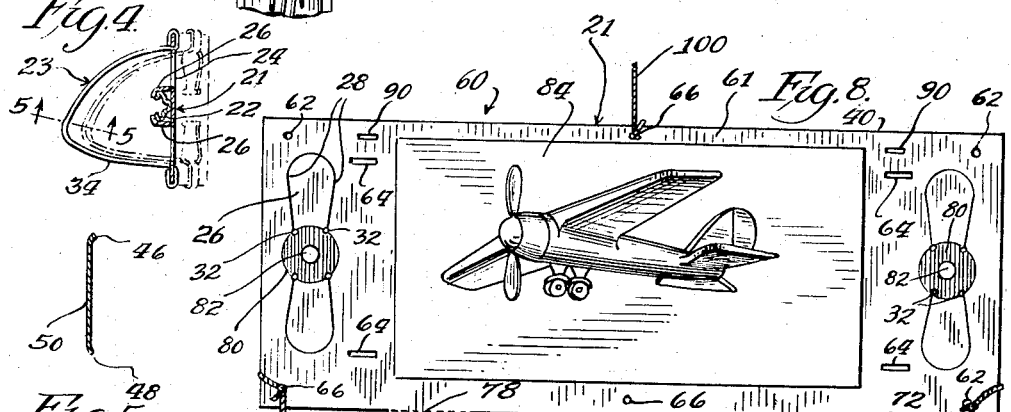
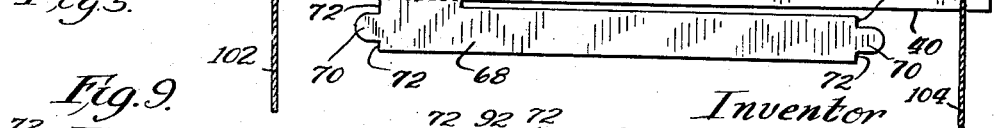
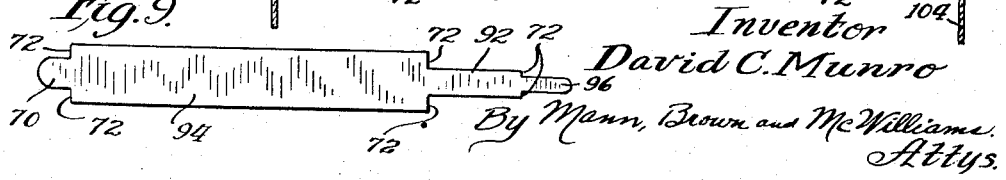
Inventor
David C. Munro
By Mann, Brown and McWilliams
Attys.

United States Patent Office 2,874,514
Patented Feb. 24, 1959

2,874,514

NOISE MAKING DEVICE FOR VELOCIPEDES OR THE LIKE

David C. Munro, Chicago, Ill.

Application December 12, 1955, Serial No. 552,346

4 Claims. (Cl. 46—175)

My invention relates to a noise making device for velocipedes or the like, and more particularly, to a device adapted to cooperate with the spokes of, for instance, a bicycle or tricycle to produce a relatively loud and attractive repeating noise.

Most noise making devices of this type include a strip of resilient plastic or the like that projects into the path of movement of the wheel spokes. As the wheel turns, the individual spokes engage the plastic strip and bend it, and as the individual spokes slip by the strip, the strip slaps up against the next succeeding spoke. Youngsters are very much attracted to these devices but due to the fact that they include, in addition to the resilient strip, at least several separate moving or movable parts, and require a secure mounting on the bicycle or tricycle frame, they are relatively expensive and therefore have only limited market possibilities.

The principal object of my invention is to provide a noise making device for velocipedes or the like that includes a minimum of parts and yet provides a noise that will be found by youngsters to be pleasing and highly desirable.

Another object of the invention is to provide a noise making device for bicycles and tricycles or the like that provides a new type of repeating noise heretofore unknown in devices of this type.

A further object of the invention is to provide a noise making device for bicycles and tricycles or the like of extremely simplified design which enables it to be manufactured at extremely low cost of materials and manufacturing expense.

Still another object of the invention is to provide a noise making device for bicycles and tricycles or the like which is designed to enable youngsters to readily assemble it and attach it to their velocipede with minimum instruction.

Still a further object of the invention is to provide a noise making device for bicycles and tricycles or the like that has a variety of other uses which will further enhance its value or attractiveness to youngsters.

Yet a further object of the invention is to provide a noise making device for bicycles and tricycles or the like which does not require spoked wheels to function and which may be applied to solid wheels or tires having spaced bumps, protuberances or holes formed thereon.

In accordance with the illustrated embodiments of the invention, I provide a two element device comprising a noise making element that is adapted to slap up against, for instance, the velocipede member to which it is secured and a cam member that projects into the velocipede spokes that actuate the device. The device is preferably supplied in the form of a blank, provided by a one step die cutting operation, with sufficient instructions to enable a youngster to apply the same to his velocipede by himself. The design, manufacture and assembly of the device are so simplified that costs are reduced to a heretofore impossible minimum while at the same time youngsters will readily comprehend the manner of assembly and use of the device.

Other objects, uses and advantages will be obvious or become apparent from a consideration of the following description and the drawing.

In the drawing:

Figure 1 is a side elevational view of the rear wheel of a conventional bicycle together with the adjacent portions of the bicycle frame, showing one embodiment of the invention applied thereto;

Figure 2 is a cross sectional view along line 2—2 of Figure 1;

Figure 3 is a cross sectional view along line 3—3 of Figure 1;

Figure 4 is a cross sectional view along line 4—4 of Figure 1;

Figure 5 is a cross sectional view, on an enlarged scale, along line 5—5 of Figure 4;

Figure 6 is a perspective view of the embodiment of the invention shown in Figures 1 through 5;

Figure 7 is a plan view of the blank from which the embodiment of Figure 6 is formed;

Figure 8 is a side elevational view on an enlarged scale of another embodiment of the invention; and Figure 9 is a plan view of a modified cam member that may be employed with the device shown in Figure 8.

Referring now more particularly to the drawing figures, wherein like numerals are employed to indicate like parts throughout several views, reference numeral 10 generally indicates a preferred embodiment of the invention applied, for instance, to a conventional bicycle 12. The bicycle 12 may include a frame 14 mounted on a rear wheel 16 in the usual manner, wheel 16 having the conventional spokes 18. The bicycle 12 also includes a conventional rear wheel fender 20 supported above the wheel by the usual fender supports 22. The illustrated device 10 is shown applied to the lower fender support 22 on the right hand side of the rear wheel of the bicycle. The device 10 includes a noise making element or member 21 and a cam element or member or means 23 that is engaged by spokes 18.

Referring to Figure 6, the device 10 comprises a generally quadrilateral (rectangular in the illustrated embodiment) sheet or strip 24 of resilient materials such as sheet metal (aluminum or the like) which is formed with tabs 26 at each end of the sheet or strip 24. The sheet or strip 24 is preferably part of a blank (shown in Figure 7). As shown in Figure 7, the tabs 26 are formed in pairs by cutting two opposed U-shaped slits 28 at each end of the sheet or strip 24. When the tabs 26 are bent outwardly of the sheet or strip 24 as shown in Figure 6 they form spaces 30. The U-shaped slits 28 may end in small rounded perforations 32 to prevent the sheet or strip 24 from splitting. The sheet or strip 24 forms the noise making element 21.

The blank also includes an appendage 34 which forms the cam member 23. The appendage 34 of the illustrated embodiment is severed from the main portion of the blank along lines 36 and 37 during the production process but which is attached to the main portion of the blank by an uncut portion 38. In the illustrated embodiment the appendage 34 has the same length as the blank to conserve material. In practice the appendage 34 may be attached to the main portion of the blank in one or several places, as desired, but the uncut portions should not be in the center since the sharp edges remaining after the appendage is detached from the blank would unduly wear away the spokes 18.

The appendage 34 that forms the cam member of the illustrated embodiment is detached from the main portion of the blank by repeated bending of it across the portion 38 until it drops off. In the device 10 the ends of the appendage are then passed through one set of holes 30 and wrapped around the portions of the sheet or strip 24 that extend between the respective spaces 30 and the edges 40 of the sheet or strip 34 (see Figure 6).

The appendage 34 when applied as shown in Figures 1 through 6 forms the camming member or means 23, the action of which is illustrated most clearly in Figure 3. As shown in Figure 3, the appendage 34, which may be also termed a strip, is preferably provided with a smoothly curved portion 42 and a more flat curved portion 44 when it is applied to the noise making element or member 21, though a simple looped generally parabolic curve provides satisfactory results.

The device 10, when applied to the rear wheel of bicycles or the like, is preferably applied to the lower fender support 22 where shown in Figure 1 by bending the pair of tabs 26 at the end of the sheet or strip 34 that is not to have the appendage or strip 34 attached thereto (those at the left of Figure 1) about the fender support as shown in Figure 4. The pair of tabs 26 at the other end of the sheet or strip 24, which are aligned transversely of the sheet or strip 24 with the looped appendage or strip 34, are preferably bent substantially parallel. The looped appendage or strip 34 is, of course, applied to the sheet or strip 34 after the latter has been secured to the fender support, the appendage 34 being shaped before being secured in the manner shown in Figure 6.

In the position of Figure 1 and Figure 3 the strip or appendage 34 forming the cam member or means 23 projects into the path of movement of the wheel spokes 18. When the wheel 16 moves in a forward direction, which is the direction of the arrow of Figure 3, the individual spokes engage the curved portion 42 of the appendage or strip 34 and force the unattached end of sheet or strip 24 outwardly of the fender support 22. After the individual spokes have passed by the curved portion 42 the resiliency of the sheet or strip 24 slaps this unattached end back against the fender support 22 to make a very attractive noise, and interesting motion for the child to watch. The tabs 26 that are transversely aligned with strip 34 serve as guide means that properly align the sheet or strip 24 with the fender support 22. The curved portion 44 permits the device to be operated when the direction of rotation of the wheel is reversed, as when the bike is backed up or when the rear wheel is supported above the ground by the stand conventionally carried by velocipedes of this type. The difference in curve in portions 42 and 44 of strip 34 tends to make different slapping noises and thus provides variation so often desired by youngsters.

As shown in Figure 5, the appendage or strip 34 is preferably cut so that its edges 46 and 48 are rounded somewhat to direct the edges of this strip away from the oncoming spokes 18. This prevents any sharp surfaces that are left by the forming operation from contacting the wheel spokes. In addition, the outer surface 50 of the appendage or strip 34 may be covered with an antifriction compound, preferably softer in consistency than the spokes, that reduces or entirely eliminates the possibility of wear on these spokes.

As indicated in Figure 2, the device 10 is preferably positioned on the fender support 22 in such a manner that the strip or appendage 34 projects into the path of movement of the spokes in or near the point where the spokes on the side of the wheel adjacent the device conventionally cross. This point is indicated at 52 in Figure 1.

While the device 10 is shown applied to the rear wheel of the bicycle 12, bicycles and tricycles or the like conventionally include a front wheel having a fender mounted in a manner similar to the way fender 20 is mounted. It will therefore be obvious that the device 10 may be attached to the fender supports of front wheel fenders as well as the fender supports of rear wheel fender of bicycles or the like.

The device 10 may also be secured to the portions of frame 12 that overlie the velocipede wheels, if so desired, and also to the wheel axle by reversing the device and forcing the axle shaft 53 through a hole 30 after the nut 51 has been removed, and then reapplying the nut. In this specification and the accompanying claims, the term "frame member" refers to elements like fender supports as well as portions of the frame that overlie the velocipede wheel or the axle of the wheel.

The device 10 may also be mounted adjacent solid wheels appropriately formed with protuberances or holes that cooperate with the cam member 23 to actuate the device. The holes or protuberances can be formed either in the tire or wheel base of the wheel.

The surface of sheet or strip 24 that is to face outwardly may have suitable decorative or advertising indicia applied thereto, such as the airplane indicated at 55, and the tabs 26 as well as the portions of sheet 24 between the tabs of each pair may be colored to resemble airplane props.

Figure 8 illustrates a modified and somewhat less simplified form 60 of the invention.

The device 60 includes a sheet or strip 61 which forms the noise making element 21 and which, in addition to the U-shaped slits 28 and the rounded perforations 32, also includes rounded perforations 62 at each corner thereof and elongate openings 64 positioned alongside of each tab 26 approximately where shown in Figure 8. The blank from which this sheet or strip 61 is formed may also be provided with rounded holes 66 intermediate the ends of the long sides 40 thereof and adjacent the edges of these long sides.

The device 60 also includes a modified appendage 68 that forms the cam member or means 23 and that includes reduced ends 70 which form shoulders 72 at each end. The appendage 68 is separated from the main portion of the blank along a substantial portion of its length but remains secured thereto by the uncut portion 78.

In the form 60 of the device, the tabs 26 are provided with a shape that simulates the props of an airplane. A suitable coloring may be applied at 80 and 82 to provide a representation of the center portion of a prop.

The outer surface 84 of the device 60 may have applied thereto a representation of an airplane, as illustrated, or may have applied thereto advertising or trademark indicia or the like.

The device 60 is applied to bicycles in the same manner as the device 10. The tabs 26 of the device 60 are bent outwardly to leave spaces 30 as before. The appendage 68 is removed from the modified sheet or strip by bending as before until it drops off and after the sheet or strip 61 is secured to a fender support or the like, the ends 70 of the strip formed by appendage 68 are inserted into the slots 64 that are positioned adjacent the unattached end of the device, and are bent over to secure them in place.

The device 60 may be modified by providing an extra relatively short opening 90 that is long enough to receive the narrow portion 92 of the modified appendage or strip 94 (see Figure 9). One end of the modified appendage 94 is formed as that of in Figure 8 and at the other end thereof includes the relatively thin portion 92 formed with the reduced end 96. The portion 92 has the same width as the end 70 of appendage 94 while the reduced end 96 is of reduced width.

The appendage 94 thus provides a camming member 23 that is adjustable in size. If a relatively flat camming member 23 is desired or is necessary, the portion 92 is inserted in one of the openings 64 formed in the modified sheet or strip 24 and bent over, as is the other end of strip 94. If it is desirable or necessary that the camming member stick further out from the sheet or strip 34, the reduced end 96 is inserted in the opening 90 and bent over.

The shoulders 72 formed by the reduced ends and portions 70, 92 and 96 abut against the surface of the device 60 and force it outwardly of the fender support 22 or the like when the individual spokes engage the cam member 23 in the manner described above. The appendages 68 and 94 are preferably rounded along their edges in the manner indicated in Figure 5.

The devices 10 and 60 are symmetrically formed so that either end of member 21 may be secured to velocipede frame member and the member 23 secured to the unattached end of member 21.

The devices 10 and 60 have other uses that youngsters will find quite attractive. For instance, it will be appreciated that the devices 10 and 60 with the respective appendages applied thereto may be placed on a youngster's study table or the like and will provide an attractive mounting for pictures and the like applied thereto. As indicated in Figure 6, the cam member 23 would provide a picture frame like support for the sheet 24 when the devices 10 and 60 are used in this manner.

As indicated in Figure 8, strings 100, 102 and 104 may be applied to the modified sheet or strip 61 and further devices 60 secured to the strings 102 and 104 to form an attractive mobile type of display device that may be hung in a youngster's room by tying string 100 to a suitable support.

I contemplate that the blanks from which the devices 10 and 60 are formed will be provided by running sheets of appropriate metal through a suitably formed die press. This one step forming operation together with the relatively inexpensive sheet metal material required and the extreme simplicity of design permit me to manufacture the devices 10 and 60 at a cost of about one cent apiece.

While only two exemplary forms of my invention are illustrated, many other forms are possible, and, of course, the invention is not limited to quadrilaterally shaped noise making strips, circular and other shapes being contemplated.

The foregoing description and the drawing are given merely to explain and illustrate my invention, and the invention is not to be limited thereto, except insofar as the appended claims are so limited, since those skilled in the art who have my disclosure before them will be able to make modifications and variations therein without departing from the scope of the invention.

I claim:

1. A noise making device for velocipedes or the like of the type having a fender positioned over the wheel thereof and mounted on fender supports that extend between the fender and the axle shaft of the wheel, said device comprising a generally planar strip of resilient material formed with a pair of spaced tabs adjacent one end thereof, said tabs being spaced apart sufficiently to receive between them a fender support and being sufficiently bendable to be bent around behind the support, whereby said strip may be secured to the support, and a cam member secured to the other end of the strip, said cam member being provided with a generally convex cam surface, said cam member and said pair of tabs being disposed in parallel planes and said cam member projecting in the same general direction away from said strip as said tabs when the latter are bent about the support, said cam member projecting into the path of movement of the wheel spokes when said strip is secured to said fender support, whereby when said wheel is actuated, said cam surface of said cam member is engaged by the individual spokes to deflect said other end of said strip away from the support, and when the individual spokes pass by said cam member, said other end of said strip slaps back against the support.

2. A noise making device for velocipedes or the like of the type having a fender positioned over the wheel thereof and mounted on fender supports that extend between the fender and the axle shaft of the wheel, said device comprising a generally planar strip of resilient material adapted to be secured to the side of a fender support that faces outwardly of the wheel, said strip being formed with a pair of spaced tabs adjacent one end thereof, said tabs extending inwardly of the wheel and being spaced apart sufficiently to receive between them the fender support, said tabs being sufficiently flexible to be bent around behind the support to secure the strip flush against the support, and a generally convex cam member secured to the other end of said strip, said cam member and said pair of tabs being disposed in parallel planes and said cam member projecting into the path of movement of the wheel spokes when said strip is secured to the support, whereby when said wheel is actuated, said cam member is engaged by the individual spokes to deflect said other end of said strip away from the support, and when the spokes pass by said cam member, said other end of said strip slaps back against the support.

3. The device set forth in claim 2 including a second pair of tabs formed in said strip at said other end thereof, said second pair of tabs extending toward said wheel when said strip is secured to the support and being spaced apart sufficiently to receive the support between them, said second pair of tabs maintaining said strip in alignment with the support during operation of the device.

4. The device set forth in claim 2 wherein said cam member comprises a strip of relatively stiff material secured at its ends to the edges of the first mentioned strip.

References Cited in the file of this patent

UNITED STATES PATENTS

| | | |
|---|---|---|
| 739,095 | Lewitz | Sept. 15, 1903 |
| 2,603,035 | Countryman et al. | July 15, 1952 |
| 2,721,421 | Steele | Oct. 25, 1955 |
| 2,735,220 | Miles | Feb. 21, 1956 |
| 2,736,136 | Modlin | Feb. 28, 1956 |
| 2,748,532 | Gergovich et al. | June 5, 1956 |
| 2,768,474 | Harvey | Oct. 30, 1956 |